United States Patent
Kang et al.

(10) Patent No.: US 11,941,848 B2
(45) Date of Patent: Mar. 26, 2024

(54) CAMERA DEVICE AND ELECTRONIC DEVICE INCLUDING THE SAME

(71) Applicant: LG ELECTRONICS INC., Seoul (KR)

(72) Inventors: Yunsuk Kang, Seoul (KR); Chanyong Park, Seoul (KR); Eunsung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 17/421,927

(22) PCT Filed: Jan. 10, 2020

(86) PCT No.: PCT/KR2020/000506
§ 371 (c)(1),
(2) Date: Jul. 9, 2021

(87) PCT Pub. No.: WO2020/145740
PCT Pub. Date: Jul. 16, 2020

(65) Prior Publication Data
US 2022/0114754 A1    Apr. 14, 2022

(30) Foreign Application Priority Data
Jan. 11, 2019 (KR) .......................... 10-2019-0003611

(51) Int. Cl.
*G06T 7/80* (2017.01)
*G06T 3/40* (2006.01)
(Continued)

(52) U.S. Cl.
CPC .................. *G06T 7/80* (2017.01); *G06T 3/40* (2013.01); *G06T 7/33* (2017.01); *H04N 23/6812* (2023.01);
(Continued)

(58) Field of Classification Search
CPC .... G06T 7/80; G06T 3/40; G06T 7/33; G06T 2207/10024; G06T 2207/10048;
(Continued)

(56) References Cited

U.S. PATENT DOCUMENTS

2009/0201384 A1    8/2009   Kang et al.
2013/0004060 A1 *  1/2013   Bell ..................... H04N 13/257
                                                          382/154
(Continued)

FOREIGN PATENT DOCUMENTS

JP    2005-078314 A    3/2005
JP    6261994 B2       1/2018
(Continued)

*Primary Examiner* — Christopher K Peterson
(74) *Attorney, Agent, or Firm* — Birch, Stewart, Kolasch & Birch, LLP

(57) ABSTRACT

The present disclosure relates to a camera device. The camera device and an electronic device including the same according to an embodiment of the present disclosure include: a color camera; an IR camera; and a processor configured to extract a first region of a color image from the color camera, to extract a second region of an IR image from the IR camera, to calculate error information based on a difference between a gradient of the first region and a gradient of the second region, to compensate for at least one of the color image and the IR image based on the calculated error information, and to output a compensated color image or a compensated IR image.

16 Claims, 31 Drawing Sheets

(51) Int. Cl.
*G06T 7/33* (2017.01)
*H04N 23/68* (2023.01)
*H04N 23/80* (2023.01)
*H04N 23/90* (2023.01)

(52) U.S. Cl.
CPC ............ H04N 23/80 (2023.01); H04N 23/90 (2023.01); *G06T 2207/10024* (2013.01); *G06T 2207/10048* (2013.01); *G06T 2207/20212* (2013.01)

(58) Field of Classification Search
CPC ............ G06T 2207/20212; G06T 5/50; G06T 2207/20221; H04N 23/6812; H04N 23/80; H04N 23/90; H04N 23/45; H04N 23/81; H04N 17/002; H04N 5/33; H04N 13/25; H04N 13/128; H04N 13/15; H04N 13/239; H04N 13/257
See application file for complete search history.

(56) References Cited

U.S. PATENT DOCUMENTS

| | | |
|---|---|---|
| 2013/0010079 A1 | 1/2013 | Zhang et al. |
| 2016/0321809 A1* | 11/2016 | Chukka ................ G06V 20/695 |
| 2017/0070653 A1* | 3/2017 | Irschick ................ H04N 13/282 |
| 2017/0104979 A1 | 4/2017 | Shaw et al. |
| 2017/0206670 A1* | 7/2017 | Miyasa ..................... G06T 7/33 |
| 2018/0315213 A1* | 11/2018 | Surazhsky ............ G06F 18/214 |
| 2019/0080431 A1* | 3/2019 | Choi .................... G06V 40/172 |

FOREIGN PATENT DOCUMENTS

| | | |
|---|---|---|
| KR | 10-2013-0121621 A | 11/2013 |
| KR | 10-2014-0126826 A | 11/2014 |
| KR | 10-2015-0140380 A | 12/2015 |
| KR | 10-1789979 B1 | 10/2017 |
| KR | 10-2018-0101496 A | 9/2018 |

* cited by examiner (a)  —510

(b)  —515

(a) 510

(b) 515

(a)

(b)

(a)  (b)

(c)

CAMERA DEVICE AND ELECTRONIC DEVICE INCLUDING THE SAME

CROSS REFERENCE TO RELATED APPLICATIONS

This application is the National Phase of PCT International Application No. PCT/KR2020/000506, filed on Jan. 10, 2020, which claims priority under 35 U.S.C. 119(a) to Patent Application No. 10-2019-0003611, filed in the Republic of Korea on Jan. 11, 2019, all of which are hereby expressly incorporated by reference into the present application.

BACKGROUND OF THE DISCLOSURE

1. Field of the Disclosure

The present disclosure relates to a camera device and an electronic device including the same, and more particularly to a camera device capable of rapidly and accurately compensating for a difference between a color image from a color camera and an IR image from an IR camera, and an electronic device including the same.

2. Description of the Related Art

A camera device is an image capturing device. Recently, cameras are employed in various electronic devices.

Meanwhile, the camera device may include a plurality of cameras.

For example, the camera device may include two color cameras or may include one color camera and one IR camera.

Meanwhile, in the case where the camera device includes the color camera and the IR camera, the camera device may perform signal processing by combining a color image, obtained from the color camera, with an IR image from the IR camera. In this case, calibration is required between the color image and the IR image.

Meanwhile, in the case where the camera device is mounted in an electronic device, if there is no bracket for fixing the color camera and the IR camera in order to allow freedom of design of the electronic device, a distance and the like between the color camera and the IR camera may change irregularly, in which case calibration is further required between the color image and the IR image.

SUMMARY

It is an object of the present disclosure to provide a camera device capable of rapidly and accurately compensating for a difference between a color image from a color camera and an IR image from an IR camera, and an electronic device including the same.

It is another object of the present disclosure to provide a camera device having no bracket in the color camera and the IR camera, and an electronic device including the same.

In accordance with an aspect of the present disclosure, the above and other objects can be accomplished by providing a camera device and an electronic device including the same, which include: a color camera; an IR camera; and a processor configured to extract a first region of a color image from the color camera, to extract a second region of an IR image from the IR camera, to calculate error information based on a difference between a gradient of the first region and a gradient of the second region, to compensate for at least one of the color image and the IR image based on the calculated error information, and to output a compensated color image or a compensated IR image.

Meanwhile, the processor may extract a first region of a color image from the color camera and a second region of an IR image from the IR camera; may calculate three-dimensional (3D) error information based on a difference between a gradient of the first region and a gradient of the second region; based on the calculated 3D error information, may compensate for at least one of the color image and the IR image to output the compensated color image or the compensated IR image.

Meanwhile, the processor may normalize the gradient of the first region and the gradient of the second region, and may calculate 3D error information based on a difference between the normalized gradient of the first region and the normalized gradient of the second region; and based on the calculated 3D error information, may compensate for at least one of the color image and the IR image to output the compensated color image or the compensated IR image.

Meanwhile, the processor may update the 3D error information based on pre-stored 3D error information and the calculated 3D error information, and may compensate for at least one of the color image and the IR image based on the updated 3D error information to output the compensated color image or the compensated IR image.

Meanwhile, the processor may upscale the IR image; may extract a first region of the color image from the color camera and a second region from the upscaled IR image; may calculate 3D error information based on a difference between a gradient of the first region and a gradient of the second region; and based on the calculated 3D error information, may compensates for at least one of the color image and the IR image to output the compensated color image or the compensated IR image.

Meanwhile, in response to movement or impact sensed by a sensor device being greater than or equal to a first level, the processor may extract the first region of the color image from the color camera and the second region of the IR image from the IR camera: and may calculate error information based on the difference between the gradient of the first region and the gradient of the second region, and may compensate for at least one of the color image and the IR image based on the calculated error information to output the compensated color image or the compensated IR image.

Meanwhile, the first region and the second region may include a face region.

Meanwhile, the gradient may include gradients of rotation information, translation information, or shift information of the color image or the IR image.

Meanwhile, the processor may extract a first region of the color image from the color camera and a second region of the IR image from the IR camera, may calculate error information based on a difference between a gradient of a luminance component of the first region and a gradient of a luminance component of the second region, and may compensate for at least one of the color image and the IR image based on the calculated error information to output a compensated color image or a compensated IR image.

Meanwhile, the processor may include: a feature point analyzer configured to analyze each feature point of the color image from the color camera and the IR image from the IR camera; an external variable calculator configured to calculate an external variable based on each feature point information analyzed by the feature point analyzer; an error calculator configured to calculate 3D error information based on the calculated external variable; and an error corrector configured to correct an error based on the 3D error information.

Meanwhile, based on each feature point information analyzed by the feature point analyzer, the external variable calculator may calculate rotation information, translation information, or shift information of each of the color image and the IR image.

Meanwhile, based on the rotation information, the translation information, or the shift information of each of the color image and the IR image, the error calculator may calculate relative rotation information, relative translation information, or relative shift information between the color image and the IR image.

Meanwhile, the color camera and the IR camera may be connected by a connection member, wherein the connection member may be flexible.

EFFECTS OF THE DISCLOSURE

A camera device and an electronic device including the same include: a color camera; an IR camera; and a processor configured to extract a first region of a color image from the color camera, to extract a second region of an IR image from the IR camera, to calculate error information based on a difference between a gradient of the first region and a gradient of the second region, to compensate for at least one of the color image and the IR image based on the calculated error information, and to output a compensated color image or a compensated IR image, thereby rapidly and accurately compensating for a difference between the color image from the color camera and the IR image from the IR camera.

Meanwhile, the processor may extract a first region of a color image from the color camera and a second region of an IR image from the IR camera; may calculate three-dimensional (3D) error information based on a difference between a gradient of the first region and a gradient of the second region; based on the calculated 3D error information, may compensate for at least one of the color image and the IR image to output the compensated color image or the compensated IR image. Particularly, based on the calculated 3D error information, the difference between the color image from the color camera and the IR image from the IR camera may be compensated rapidly and accurately.

Meanwhile, the processor may normalize the gradient of the first region and the gradient of the second region, and may calculate 3D error information based on a difference between the normalized gradient of the first region and the normalized gradient of the second region; and based on the calculated 3D error information, may compensate for at least one of the color image and the IR image to output the compensated color image or the compensated IR image. Particularly, by normalization, the difference between the color image from the color camera and the IR image from the IR camera may be compensated rapidly and accurately.

Meanwhile, the processor may update the 3D error information based on pre-stored 3D error information and the calculated 3D error information, and may compensate for at least one of the color image and the IR image based on the updated 3D error information to output the compensated color image or the compensated IR image. Accordingly, by updating the 3D error information which is changed by an external impact and the like, the difference between the color image from the color camera and the IR image from the IR camera may be compensated rapidly and accurately.

Meanwhile, the processor may upscale the IR image; may extract a first region of the color image from the color camera and a second region from the upscaled IR image; may calculate 3D error information based on a difference between a gradient of the first region and a gradient of the second region; and based on the calculated 3D error information, may compensates for at least one of the color image and the IR image to output the compensated color image or the compensated IR image. Accordingly, the difference between the color image from the color camera and the IR image from the IR camera may be compensated rapidly and accurately.

Meanwhile, in response to movement or impact sensed by a sensor device being greater than or equal to a first level, the processor may extract the first region of the color image from the color camera and the second region of the IR image from the IR camera: and may calculate error information based on the difference between the gradient of the first region and the gradient of the second region, and may compensate for at least one of the color image and the IR image based on the calculated error information to output the compensated color image or the compensated IR image. Accordingly, if there is an external impact and the like, the difference between the color image from the color camera and the IR image from the IR camera may be compensated rapidly and accurately.

Meanwhile, the first region and the second region may include a face region. Accordingly, based on the common face region, the difference between the color image from the color camera and the IR image from the IR camera may be compensated rapidly and accurately.

Meanwhile, the processor may extract a first region of the color image from the color camera and a second region of the IR image from the IR camera, may calculate error information based on a difference between a gradient of a luminance component of the first region and a gradient of a luminance component of the second region, and may compensate for at least one of the color image and the IR image based on the calculated error information to output a compensated color image or a compensated IR image. Accordingly, the difference between the color image from the color camera and the IR image from the IR camera may be compensated rapidly and accurately.

Meanwhile, the processor may include: a feature point analyzer configured to analyze each feature point of the color image from the color camera and the IR image from the IR camera; an external variable calculator configured to calculate an external variable based on each feature point information analyzed by the feature point analyzer; an error calculator configured to calculate 3D error information based on the calculated external variable; and an error corrector configured to correct an error based on the 3D error information. Accordingly, the difference between the color image from the color camera and the IR image from the IR camera may be compensated rapidly and accurately.

Meanwhile, based on each feature point information analyzed by the feature point analyzer, the external variable calculator may calculate rotation information, translation information, or shift information of each of the color image and the IR image. Accordingly, the difference between the color image from the color camera and the IR image from the IR camera may be compensated rapidly and accurately.

Meanwhile, based on the rotation information, the translation information, or the shift information of each of the color image and the IR image, the error calculator may calculate relative rotation information, relative translation information, or relative shift information between the color image and the IR image. Accordingly, the difference between the color image from the color camera and the IR image from the IR camera may be compensated rapidly and accurately.

Meanwhile, the color camera and the IR camera may be connected by a connection member, wherein the connection member may be flexible, thereby improving a degree of freedom in designing a space of the camera device or the electronic device in which the camera device is mounted.

DETAILED DESCRIPTION OF THE PREFERRED EMBODIMENTS

Hereinafter, the present disclosure will be described in detail with reference to the accompanying drawings. With respect to constituent elements used in the following description, suffixes "module" and "unit" are given only in consideration of ease in the preparation of the specification, and do not carry any important meaning or role. Therefore, the suffixes "module" and "unit" may be used interchangeably.

Figure 1A:
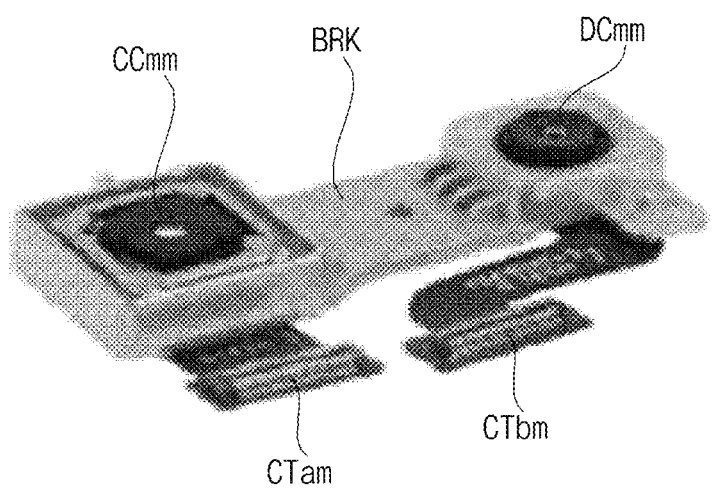
FIG. 1A is a diagram illustrating the appearance of a camera device related to the present disclosure.

FIG. 1A is a diagram illustrating the appearance of a camera device related to the present disclosure.

Referring to the drawing, an example is illustrated in which a camera device 100m includes a color camera CCmm, an IR camera DCmm, a bracket BRK for fixing the color camera CCmm and the IR camera DCmm, an interface CTam of the color camera CCmm, an interface CTbm of the IR camera DCmm.

Due to the bracket BRK for fixing the color camera CCmm and the IR camera DCmm in the camera device 100m according to FIG. 1A, there may be limitations in designing a space of the camera device 100m or an electronic device in which the camera device 100m is mounted.

Figure 1B:
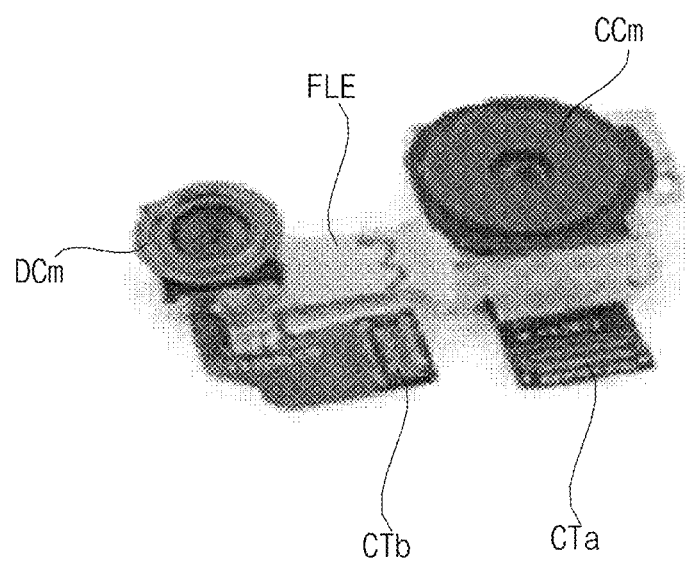
FIG. 1B is a diagram illustrating the appearance of a camera device according to an embodiment of the present disclosure.

FIG. 1B is a diagram illustrating the appearance of a camera device according to an embodiment of the present disclosure.

Referring to the drawing, an example is illustrated in which a camera device 100 includes a color camera CCm, an IR camera DCm, a connection member FLE for connecting the color camera CCm and the IR camera DCm, an interface CTa of the color camera CCm, and an interface CTb of the IR camera DCm.

Meanwhile, the connection member FLE for connecting the color camera CCm and the IR camera DCm may be flexible. That is, unlike FIG. 1A, the bracket BRK may not be provided. Accordingly, having no bracket, the camera device 100 or the electronic device in which the camera device 100 is mounted may have an improved degree of freedom of design.

Meanwhile, in the camera device 100 of FIG. 1B, a distance between the color camera CCm and the IR camera DCm and the like may change irregularly, in which case calibration is required between a color image and an IR image. The calibration between the color image and the IR image will be described with reference to FIG. 6 and the following figures.

Meanwhile, the camera device 100 according to the embodiment of FIG. 1B of the present disclosure may be provided in various electronic devices.

Figure 2:
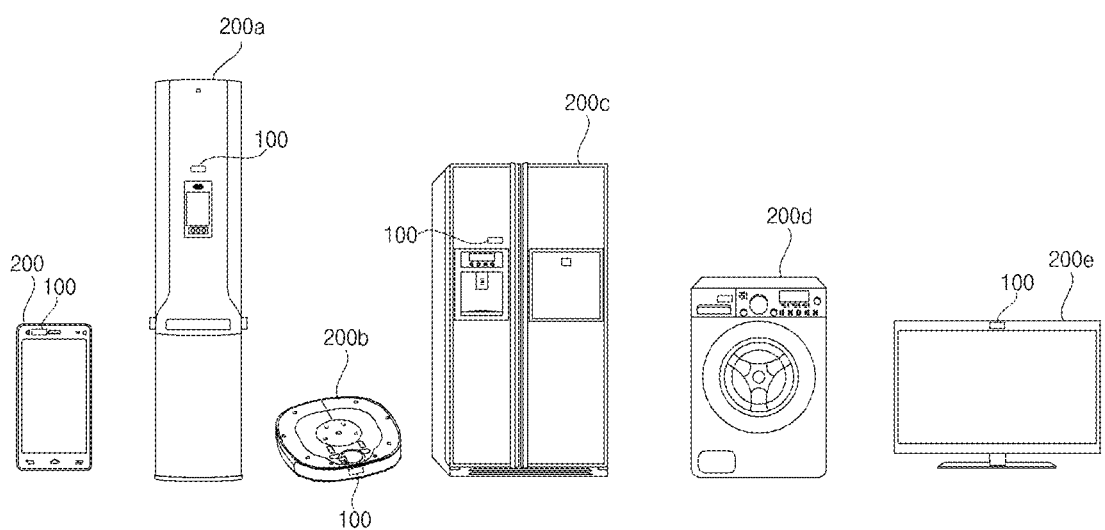
FIG. 2 is a diagram explaining various examples of an electronic device.

FIG. 2 is a diagram explaining various examples of an electronic device.

Referring to FIG. 2, the camera device 100 according to the embodiment of FIG. 1B of the present disclosure may be employed in a mobile terminal 200, an air conditioner 200a, a robot cleaner 200b, a refrigerator 200c, a washing machine 200d, a TV 200e, a vehicle, a drone, and the like.

The following description will be made based on the camera device 100 provided in the mobile terminal 200.

Figure 3A:
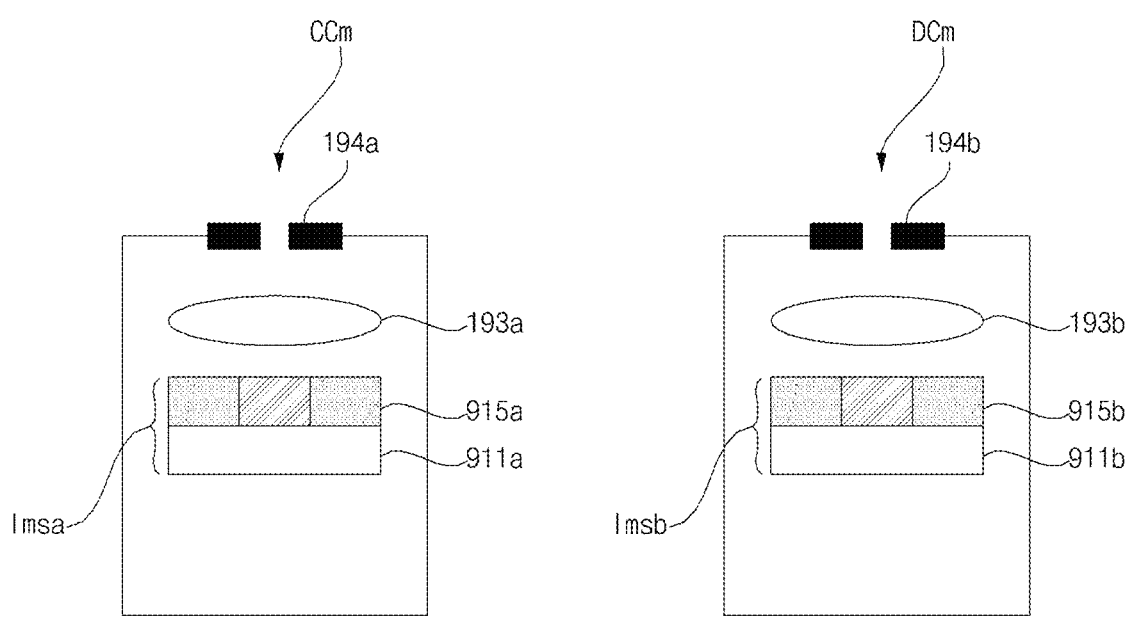
FIG. 3A is an internal cross-sectional view of a color camera and an IR camera of FIG. 1B.

FIG. 3A is an internal cross-sectional view of a color camera and an IR camera of FIG. 1B.

Referring to the drawing, the color camera CCm may include an aperture 194a, a lens device 193a, and an image sensor Imsa.

The aperture 194a may permit or prevent light incident upon the lens device 193a.

The lens device 193a may include a plurality of lenses which are adjusted for focus variation.

For sensing RGB colors, the image sensor Imsa may include a RGb filter 915a, and a sensor array 911a for converting an optical signal into an electrical signal.

Accordingly, the image sensor Imsa may sense and output a color image.

The IR camera DCm may include an aperture 194b, a lens device 193b, and an image sensor Imsb.

The aperture 194b may permit or prevent light incident upon the lens device 193b.

The lens device 193b may include a plurality of lenses which are adjusted for focus variation.

For sensing an IR image, the image sensor Imsb may include an IR filter 915b, and a sensor array 911a for converting an optical signal into an electrical signal.

Accordingly, the image sensor Imsb may sense and output an IR image.

Meanwhile, in addition to the color image, the color camera CCm may output images of various colors. For example, the color camera CCm may output a W color image, RGBY images, or the like.

Figure 3B:
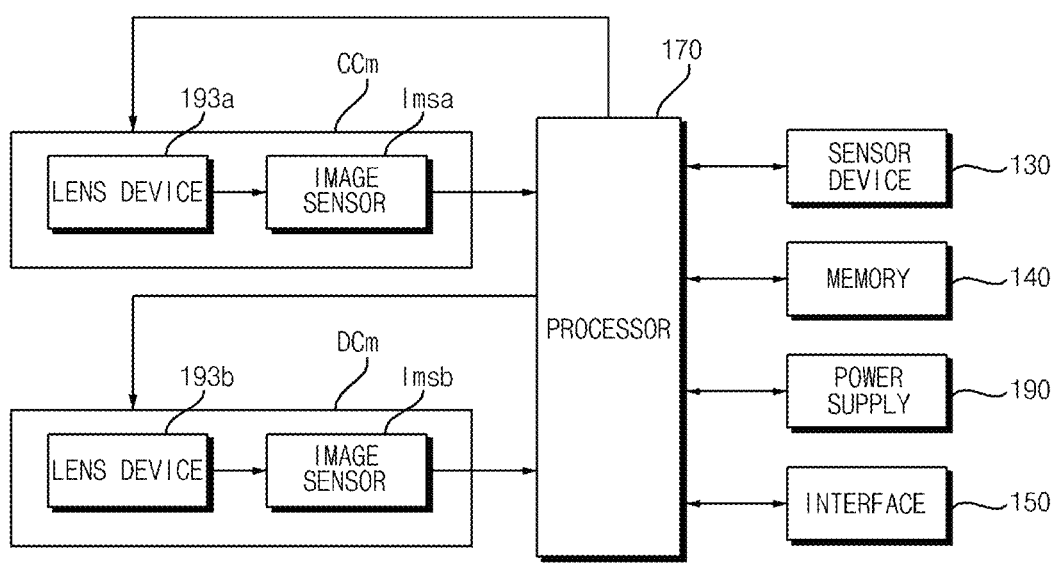
FIG. 3B is an internal block diagram of a camera device including the color camera and the IR camera of FIG. 1B.

FIG. 3B is an internal block diagram of a camera device including the color camera and the IR camera of FIG. 1B.

Referring to the drawing, the camera device 100 may include the color camera CCm, the IR camera DCm, a processor 170, a sensor device 130, a memory 140, a power supply 190, and an interface 150.

For outputting a color image, the color camera CCm may include the lens device 193a and the image sensor Imsa.

The lens device 193*a* in the color camera CCm may include a plurality of lenses which receive the incident light and are adjusted for focus variation.

Meanwhile, an exposure time of the image sensor Imsa may be adjusted based on an electronic signal.

For outputting an IR image, the IR camera DCm may include the lens device 193*b* and the image sensor Imsb.

The lens device 193*b* in the IR camera DCm may include a plurality of lenses which receive the incident light and are adjusted for focus variation.

Meanwhile, the processor 170 may receive the color image which is based on the electronic signal from the image sensor Imsa in the color camera CCm. Alternatively, the processor 170 may generate a color image based on the electronic signal from the image sensor Imsa in the color camera CCm.

Meanwhile, the processor 170 may receive the IR image which is based on the electronic signal from the image sensor Imsb in the IR camera DCm. Alternatively, the processor 170 may generate an IR image based on the electronic signal from the image sensor Imsb in the IR camera DCm.

Meanwhile, the processor 170 may calculate error information based on a difference between the color image, obtained from the color camera CCm, and the IR image from the IR camera DCm, and may compensate for at least one of the color image and the IR image based on the calculated error information and may output the compensated color image or the compensated IR image.

Meanwhile, by analyzing each feature point of the color image from the color camera CCm and the IR image from the IR camera, the processor 170 may calculate three-dimensional (3D) error information, and may compensate for at least one of the color image and the IR image based on the calculated 3D error information, to output the compensated color image or the compensated IR image.

Meanwhile, the processor 170 may upscale the IR image, may calculate 3D error information between the upscaled IR image and the color image, and may compensate for at least one of the color image and the IR image based on the calculated 3D error information, to output the compensated color image or the compensated IR image.

Meanwhile, by matching the compensated and upscaled IR image with the color image based on the calculated 3D error information, the processor 170 may output the compensated color image.

Meanwhile, by comparing a luminance component of a color image Imgr with a luminance component of the IR image Imgt, the processor 170 may calculate error information, and may compensate for at least one of the color image and the IR image based on the calculated error information to output the compensated color image or the compensated IR image.

The sensor device 130 may sense movement information, position information, or the like of the camera device 100. To this end, the sensor device 130 may include a GPS receiving unit, an inertial sensor (gyro sensor, acceleration sensor, etc.), and the like.

The memory 140 may store data for operation of the camera device 100 or the color image from the color camera CCm, the IR image from the IR camera DCm, or the compensated color image or the compensated IR image.

The interface 150 may be used for data transmission with other units of the camera device 100.

The power supply 190 may supply power for operation of the camera device 100.

For example, the power supply 190 may convert DC power or AC power input from an external source and may supply the converted DC power to the processor 170, the color camera CCm, the IR camera DCm, the sensor device 130, the memory 140, the interface 150, and the like.

FIGS. 4A to 5C are diagrams referred to in the description of an operation of the camera device of FIG. 3B.

Figure 4A:
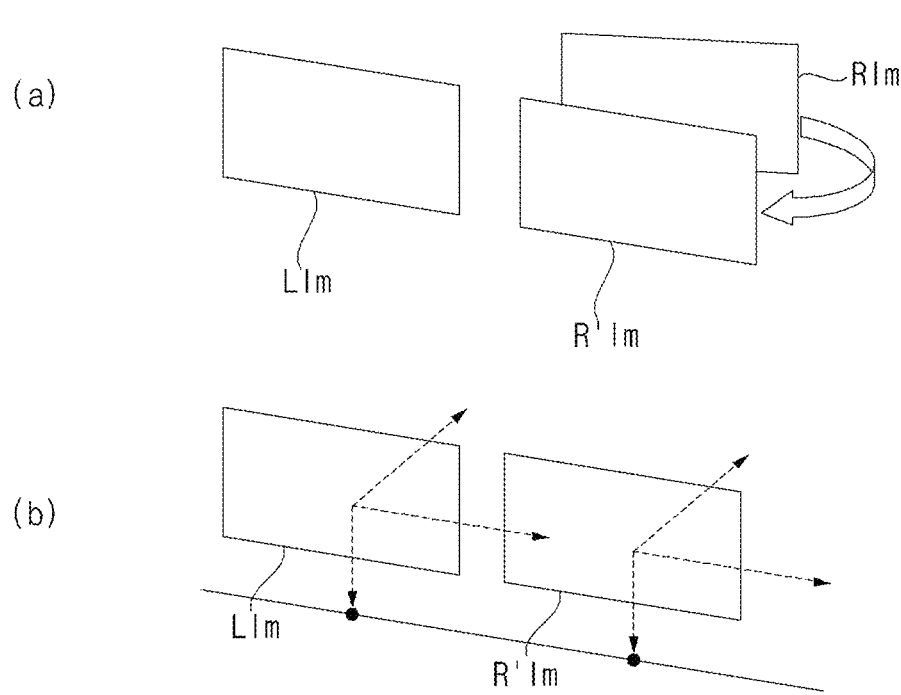
FIGS. 4A to 5C are diagrams referred to in the description of an operation of the camera device of FIG. 3B.

First, (a) of FIG. 4A illustrates an example of calibrating an IR image Rim due to a distortion between a color image Lim obtained from the color camera CCm and an IR image Rim obtained from the IR camera DCm. Specifically, (a) of FIG. 4A illustrates an IR image R'im obtained by compensating for the IR image Rim.

The compensated IR image Rim may be an image which is compensated based on at least one of 3D translation, 3D shift, and 3D rotation.

Here, the 3D rotation may include yaw, pitch, and roll rotations.

Then, (b) of FIG. 4A illustrates the color image Lim and the compensated IR image R'im which are aligned regularly. Accordingly, by matching the color image Lim with the compensated IR image R'im, the compensated color image or the compensated IR image may be output.

Figure 4B:
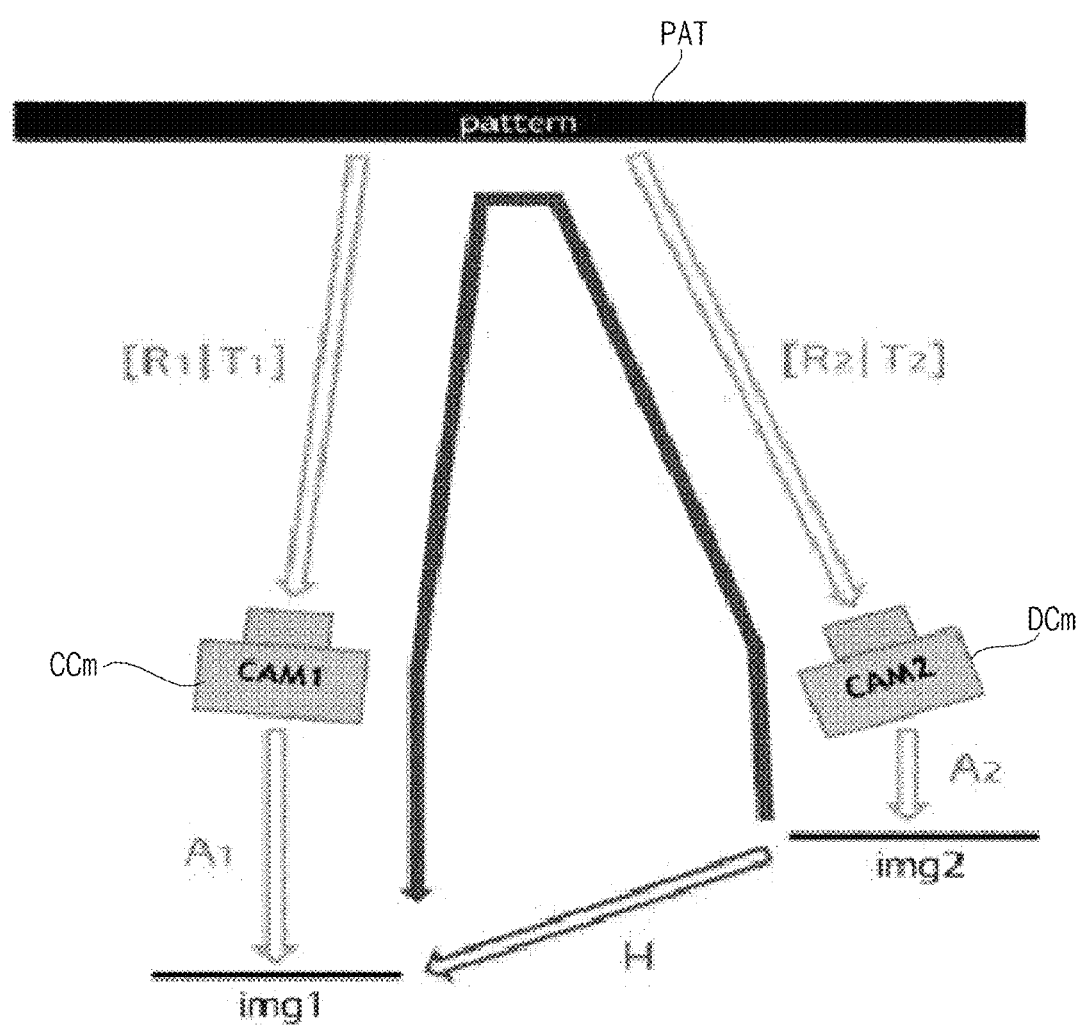

FIG. 4B illustrates an example of photographing the same pattern PAT by using the color camera CCm and the IR camera DCm.

A misalignment, such as [R1, T1., occurs due to the 3D rotation, 3D translation, and the like of the color camera CCm, such that a color image img1 is obtained from the color camera CCm.

Then, a misalignment, such as [R2, T2., occurs due to the 3D rotation, 3D translation, and the like of the IR camera DCm, such that an IR image img2 is obtained from the IR camera DCm.

Meanwhile, a difference between the color image img1 and the IR image img2 may be represented by a degree of distortion H.

Meanwhile, in order to minimize a difference between the color image img1 and the IR image img2, the processor 170 may calculate a degree of distortion H, which is a difference between the color image img1 and the IR image img2, misalignment information [R1, T1., such as rotation, translation, and the like of the color image img1, and misalignment information [R2, T2., such as rotation, translation, and the like of the IR image img2.

Further, based on the degree of distortion H, the misalignment information [R1, T1., such as rotation, translation, and the like of the color image img1, and the misalignment information [R2, T2., such as rotation, translation, and the like of the IR image img2, the processor 170 may output the compensated color image or the compensated IR image for reducing an error.

Figure 5A:
Figure 5A:

FIG. 5A illustrates a color image 510 obtained from the color camera CCm and an IR image 515 obtained from the IR camera DCm in the camera device 100.

If there is a difference in resolution between the color camera CCm and the IR camera DCm, a resolution of the color image 510 may be higher than a resolution of the IR image 515.

First, in order to perform calibration based on the difference between the color image 510 and the IR image 515, it is required to adjust the resolution of the color image 510 to be the same as the resolution of the IR image 515.

To this end, the processor 170 may upscale the IR image.

Alternatively, the processor 170 may upscale the IR image and may downscale the color image.

Figure 5B:
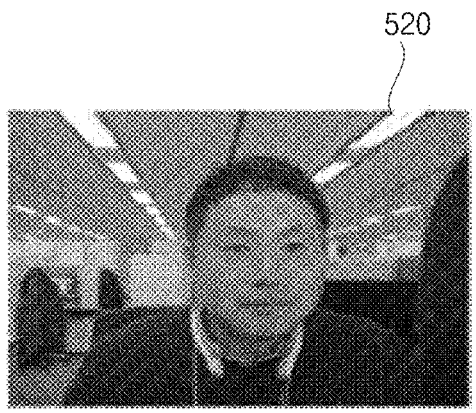
Figure 5B:

FIG. 5B illustrates a downscaled color image 520 and an upscaled IR image 525.

Meanwhile, when upscaling a low-resolution IR image, a blur and the like may occur according to a pattern included in the IR image.

Figure 5C:
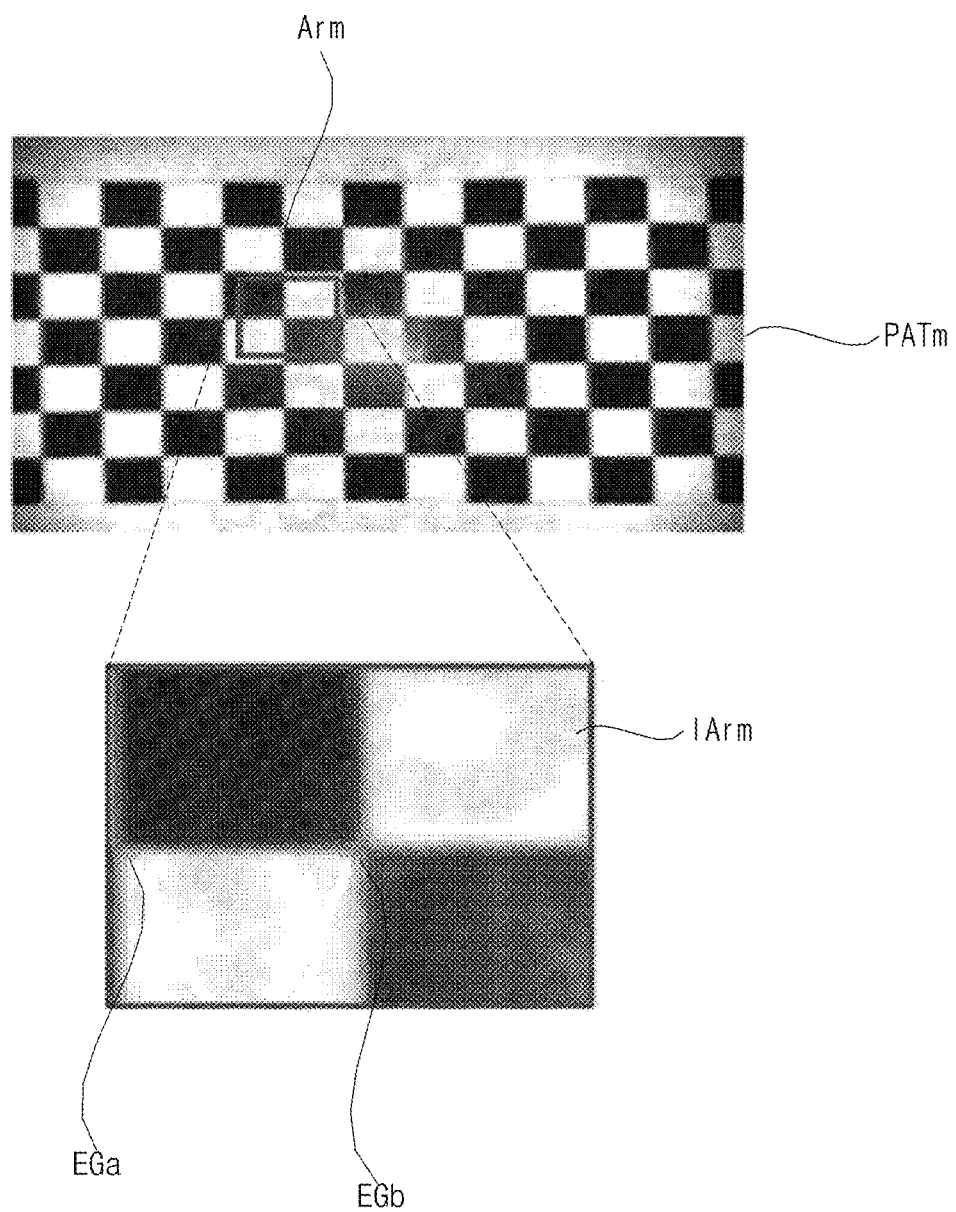

FIG. 5C illustrates an IR image IArm captured of an area Arm in a black-and-white square grid pattern.

In the IR image IArm, a blur may occur in boundaries EGa and EGb between black and white areas, and this phenomenon is more noticeable when the IR image is upscaled.

Figure 7:
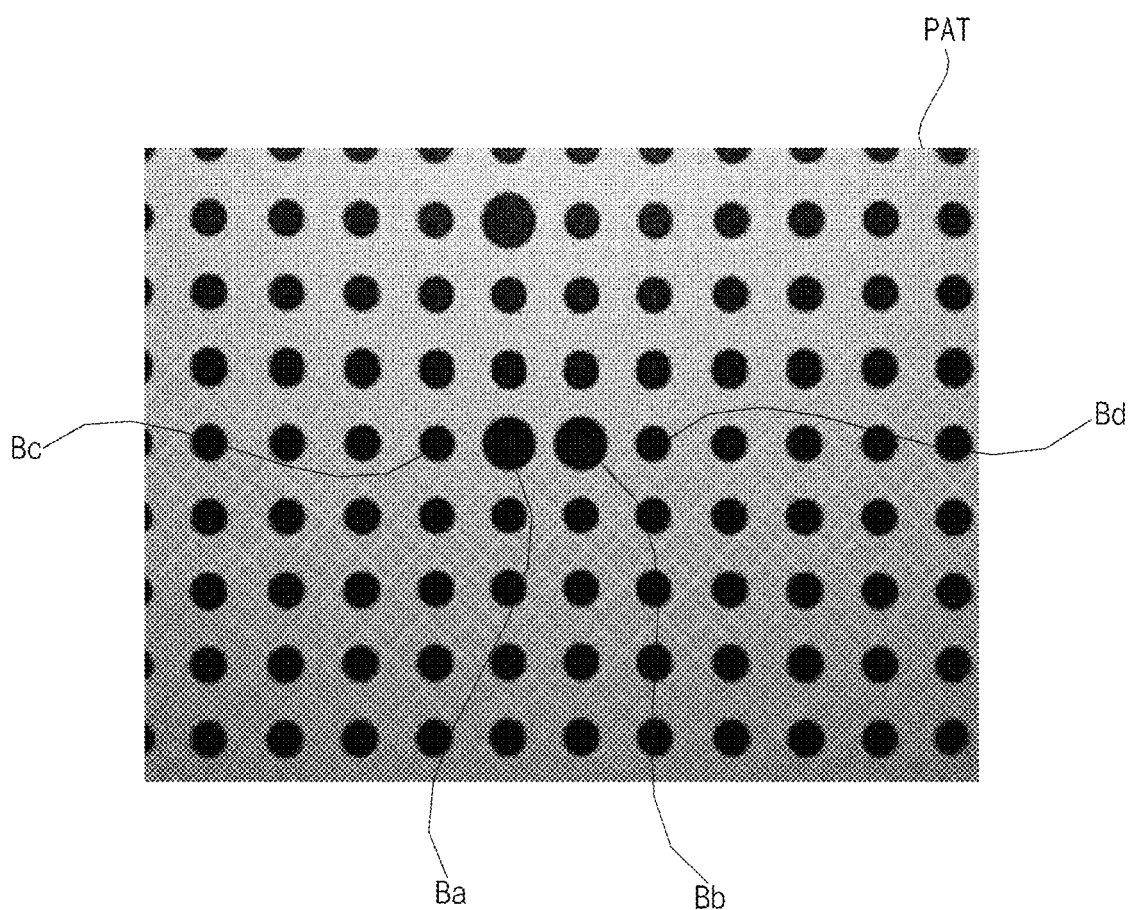
FIGS. 7 to 10F are diagrams referred to in the description of the operating method of FIG. 6.

Accordingly, a pattern used for calibration of the color camera CCm and the IR camera DCm is preferably a circular grid pattern as illustrated in FIG. 7, rather than a square grid pattern. Meanwhile, in order to determine a reference point and the like, a grid pattern of circles of a plurality of sizes may be preferable.

Figure 6:
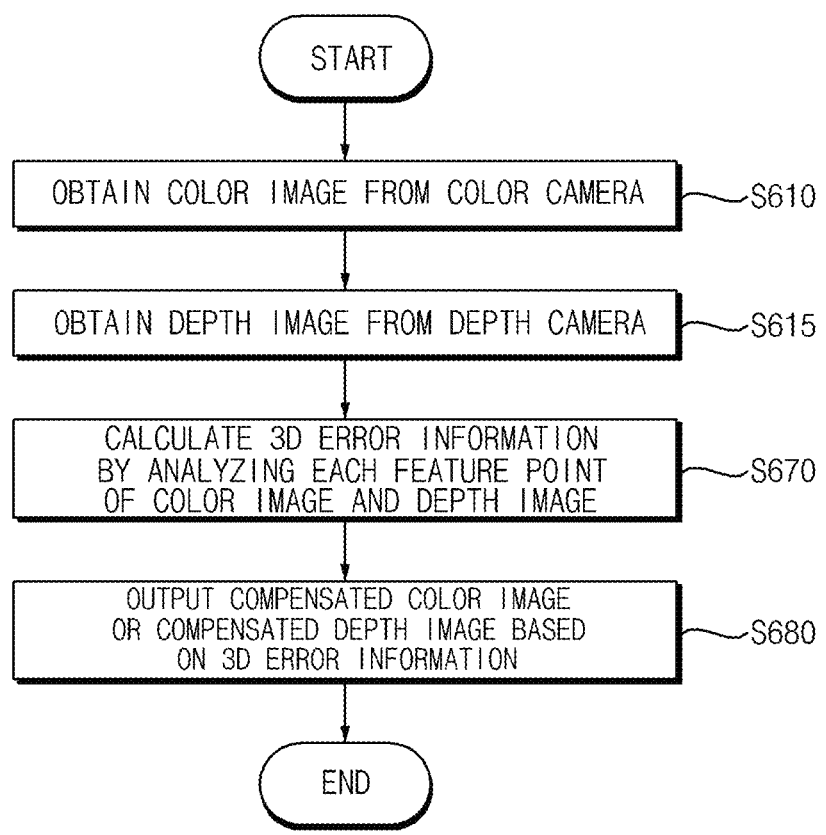
FIG. 6 is a flowchart illustrating an operating method of a camera device.

FIG. 6 is a flowchart illustrating an operating method of a camera device, and FIGS. 7 to 10F are diagrams referred to in the description of the operating method of FIG. 6.

First, referring to FIG. 6, the processor 170 in the camera device 100 obtains a color image from the color camera CCm (S610).

Then, the processor 170 in the camera device 100 obtains an IR image from the IR camera DCm (S615).

The obtained color image and IR image may be images captured of the same pattern or object.

For example, a color image and an IR image captured of a grid pattern PAT of circles of a plurality of sizes as illustrated in FIG. 7 may be obtained at a first time point.

In the grid pattern PAT of circles of a plurality of sizes illustrated in FIG. 7, circular patterns Ba and Bb of a first size are disposed at the center thereof, and circular patterns Bc and Bd of a second size are disposed around the circular patterns Ba and Bb of the first size.

In this case, the circular patterns may be in black or in colors, and a background color around the circular patterns may be white.

Figure 8A:
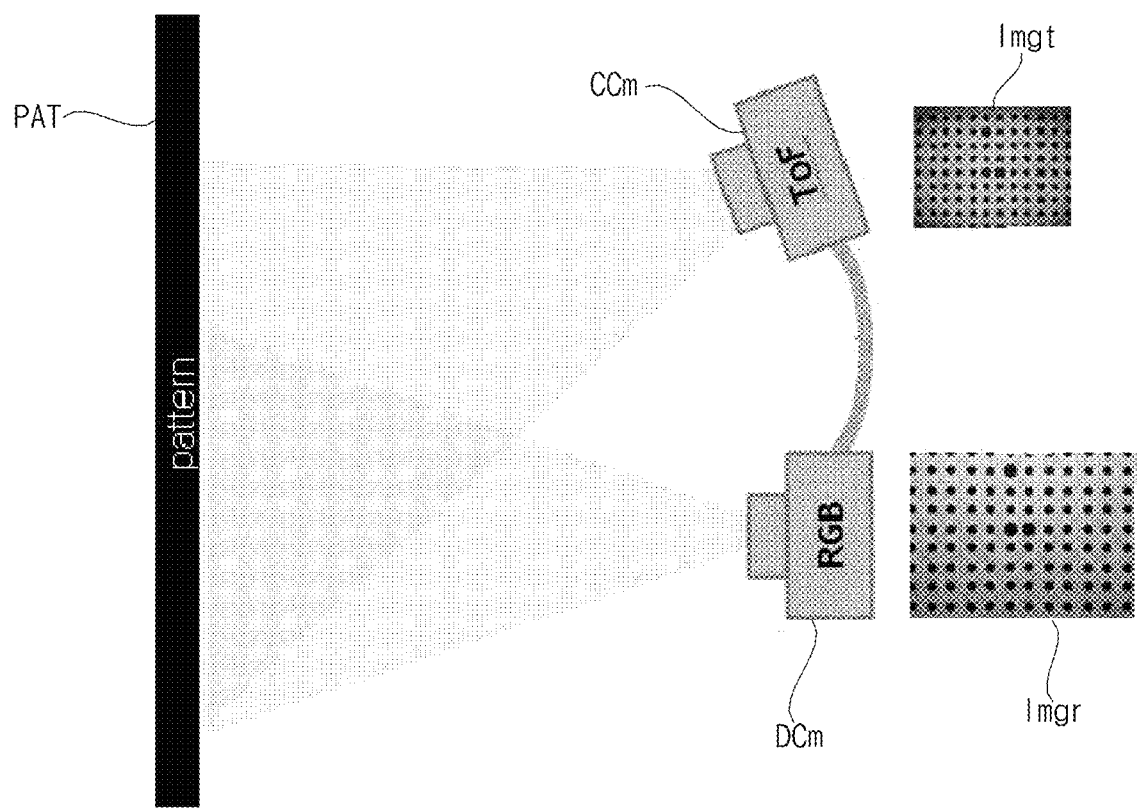
Figure 8B:
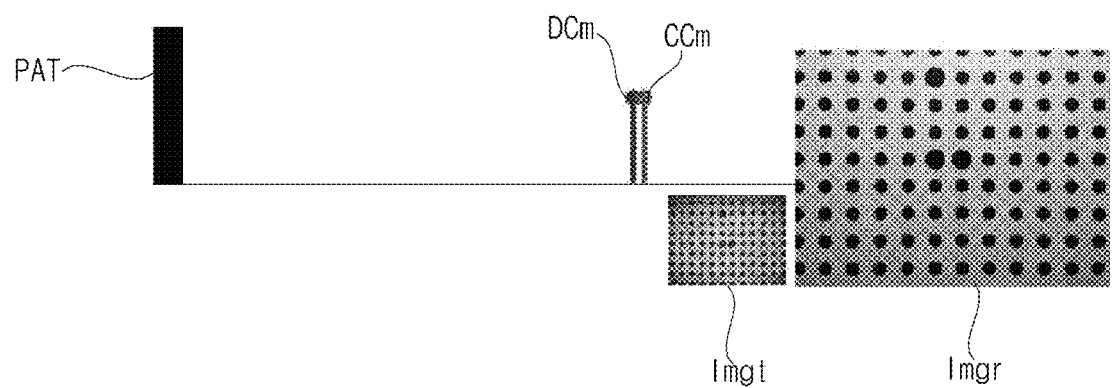

FIG. 8A illustrates a top view of the color camera CCm and the IR camera DCm capturing an image of the grid pattern PAT of circles of a plurality of sizes, and FIG. 8B illustrates a side view of the color camera CCm and the IR camera DCm capturing an image of the grid pattern PAT of circles of a plurality of sizes.

Referring to FIGS. 8A and 8B, the color camera CCm and the IR camera DCm are spaced apart from each other by a predetermined distance, in which the color camera CCm may acquire a color image Imgr, and the IR camera DCm may acquire an IR image Imgt, of the grid pattern PAT of circles of a plurality of sizes.

As described above, if there is a difference in resolution between the color camera CCm and the IR camera DCm, the processor 170 may perform upscaling and the like of the IR image Imgt.

Then, the processor 170 in the camera device 100 may calculate 3D error information by analyzing each feature point of the color image and the IR image (S670).

Subsequently, the processor 170 in the camera device 100 may output a compensated color image or a compensated IR image based on the calculated 3D error information (S680).

Meanwhile, the processor 170 may calculate error information based on the color image Imgr obtained from the color camera CCm and the IR image Imgt obtained from the IR camera DCm, and may compensate for at least one of the color image Imgr and the IR image Imgt based on the calculated error information to output the compensated color image or the compensated IR image. Accordingly, a difference between the color image Imgr from the color camera CCm and the IR image Imgt from the IR camera DCm may be compensated rapidly and accurately.

Meanwhile, by analyzing each feature point of the color image Imgr from the color camera CCm and the IR image Imgt from the IR camera DCm, the processor 170 may calculate 3D error information, and may compensate for at least one of the color image Imgr and the IR image Imgt based on the calculated 3D error information to output the compensated color image 540 or the compensated IR image Imgt. Particularly, based on the calculated 3D error information, the difference between the color image Imgr from the color camera CCm and the IR image Imgt from the IR camera DCm may be compensated rapidly and accurately.

Meanwhile, the processor 170 may upscale the IR image Imgt, may calculate 3D error information between the upscaled IR image Imgt and the color image Imgr, and may compensate for at least one of the color image Imgr and the IR image Imgt based on the calculated 3D error information to output the compensated color image or the compensated IR image. Accordingly, the difference between the color image Imgr from the color camera CCm and the IR image Imgt from the IR camera DCm may be compensated rapidly and accurately.

Meanwhile, the 3D error information may include relative rotation information, relative translation information, or relative shift information between the color image Imgr and the IR image Imgt. Accordingly, based on the relative rotation information, relative translation information, or relative shift information, the difference between the color image Imgr from the color camera CCm and the IR image Imgt from the IR camera DCm may be compensated rapidly and accurately.

Meanwhile, by matching the compensated and upscaled IR image Imgt with the color image Imgr based on the calculated 3D error information, the processor 170 may output a compensated color image. Accordingly, the difference between the color image Imgr from the color camera CCm and the IR image Imgt from the IR camera DCm may be compensated rapidly and accurately.

Meanwhile, by comparing a luminance component of the color image Imgr with a luminance component of the IR image Imgt, the processor 170 may calculate error information, and may compensate for at least one of the color image Imgr and the IR image Imgt based on the calculated error information to output the compensated color image or the compensated IR image. Accordingly, the difference between the color image Imgr from the color camera CCm and the IR image Imgt from the IR camera DCm may be compensated rapidly and accurately.

Figure 9:
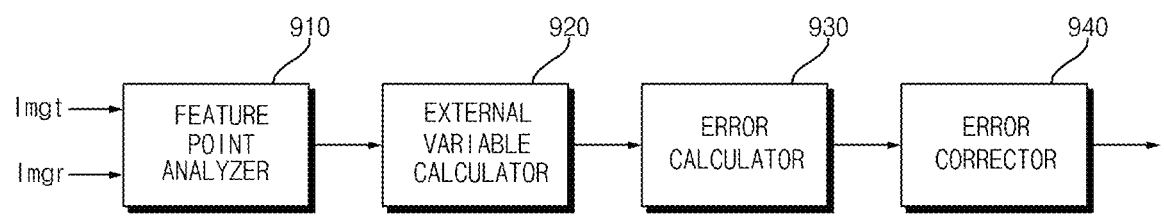

FIG. 9 illustrates an example of an internal block diagram of the processor 170.

Referring to the drawing, the processor 170 may include: a feature point analyzer 910 configured to analyze each feature point of the color image Imgr from the color camera CCm and the IR image Imgt from the IR camera DCm; an external variable calculator 920 configured to calculate an external variable based on each feature point information analyzed by the feature point analyzer 910; an error calculator 930 configured to calculate 3D error information based on the calculated external variable; and an error corrector 940 configured to correct an error based on the 3D error information. Accordingly, the difference between the color image Imgr from the color camera CCm and the IR image Imgt from the IR camera DCm may be compensated rapidly and accurately.

Figure 10A:
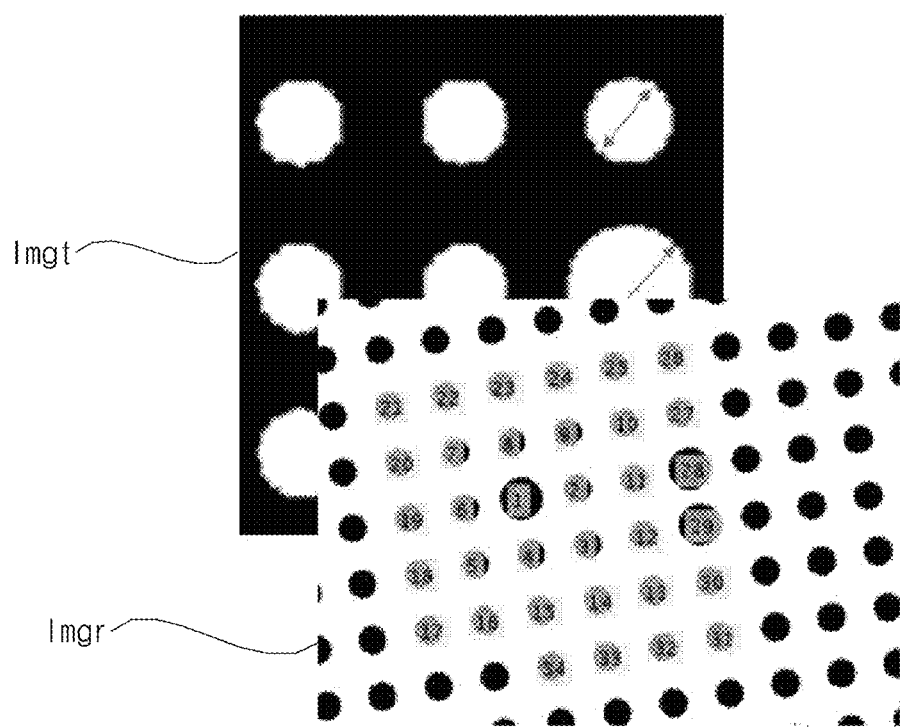

FIG. 10A illustrates the color image Imgr from the color camera CCm and the IR image Imgt from the IR camera DCm, which are input to the feature point analyzer 910.

Meanwhile, the feature point analyzer 910 may detect a pattern or a reference point from each of the color image Imgr from the color camera CCm and the IR image Imgt from the IR camera DCm, and may calculate a direction vector based on the detected pattern or reference point.

Meanwhile, the feature point analyzer 910 may detect a circular pattern from the color image Imgr and the IR image Imgt, and may detect a reference point in the circular pattern.

Meanwhile, the feature point analyzer 910 may calculate a direction vector based on the detected circular pattern or reference point.

Further, the feature point analyzer 910 may analyze the feature point based on the detected circular pattern or reference point, or the direction vector. That is, the feature point may include the circular pattern, the reference point, or the direction vector.

Meanwhile, based on each feature point information analyzed by the feature point analyzer 910, the external variable calculator 920 may calculate rotation information, translation information, or shift information of each of the color image Imgr and the IR image Imgt.

Meanwhile, the external variable calculator 920 may calculate a homography between the color image Imgr and the IR image Imgt.

Meanwhile, based on the calculated homography, the external variable calculator 920 may calculate the rotation information, the translation information, or the shift information of each of the color image Imgr and the IR image Imgt.

Meanwhile, based on the rotation information, the translation information, or the shift information of each of the color image Imgr and the IR image Imgt, the error calculator 930 may calculate relative rotation information, relative translation information, or relative shift information between the color image Imgr and the IR image Imgt.

Meanwhile, the error calculator 930 may calculate a reprojection error based on the color image Imgr and the IR image Imgt.

Figure 10B:
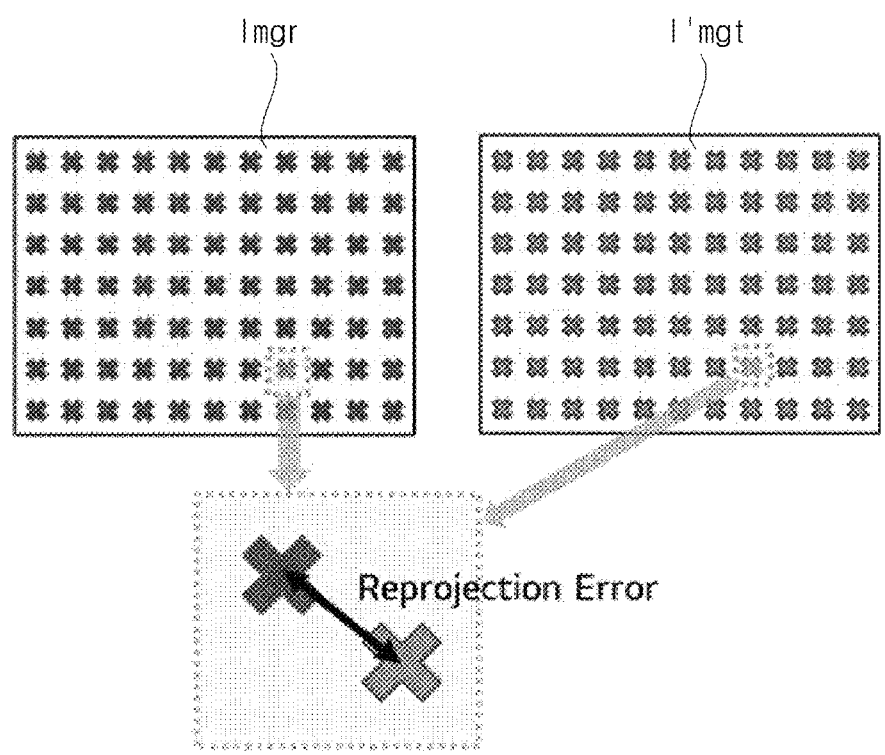

FIG. 10B illustrates an example of calculating a reprojection error based on the color image Imgr and a compensated IR image I'mgt.

The reprojection error information may include the above relative rotation information, relative translation information, or relative shift information.

Meanwhile, by matching the compensated and upscaled IR image Imgt with the color image Imgr based on the calculated 3D error information, the error corrector 940 may output a compensated color image. Accordingly, the difference between the color image Imgr from the color camera CCm and the IR image Imgt from the IR camera DCm may be compensated rapidly and accurately.

Meanwhile, the error corrector 940 may output the compensated color image or the compensated IR image based on the calculated 3D error information.

Figure 10C:
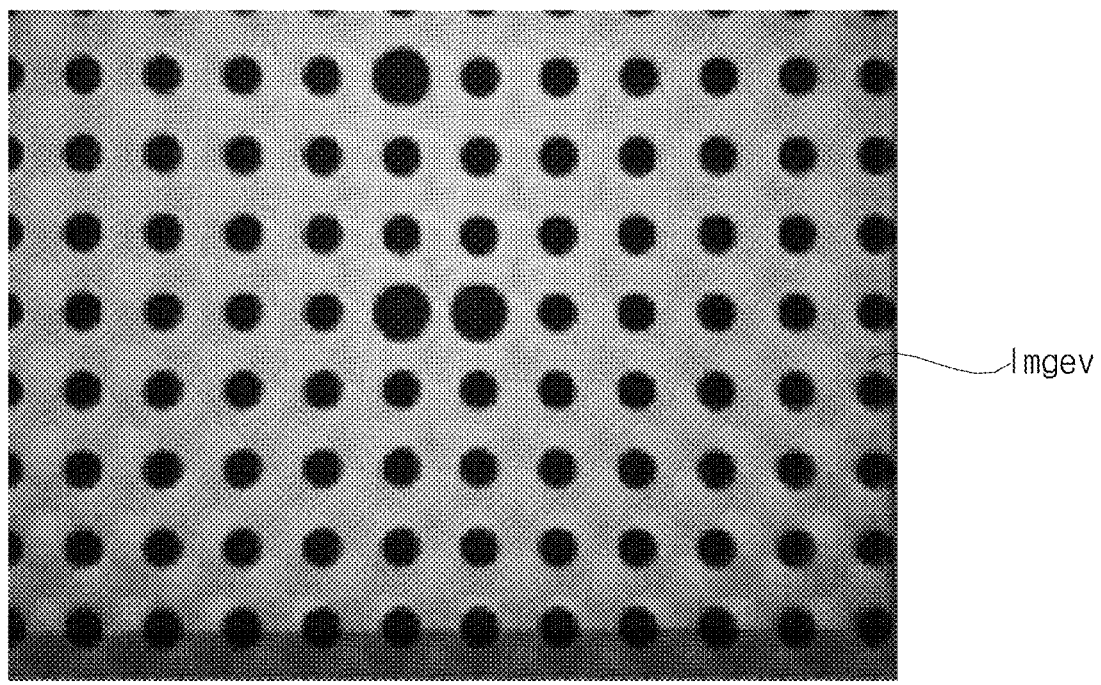

FIG. 10C illustrates an example of a compensated IR image Imgev.

Accordingly, the difference between the color image Imgr from the color camera CCm and the IR image Imgt from the IR camera DCm may be compensated rapidly and accurately.

Figure 10D:
Figure 10D:

FIG. 10D illustrates an example of another color image and another IR image.

Referring to the drawing, the processor 170 may receive a color image 510 from the color camera CCm of the camera device 100 and an IR image 515 from the IR camera DCm.

If there is a difference in resolution between the color camera CCm and the IR camera DCm, a resolution of the color image 510 may be higher than a resolution of the IR image 515, as illustrated in the drawing.

Accordingly, the processor 170 may downscale the color image 510 and may upscale the IR image 515.

Figure 10E:
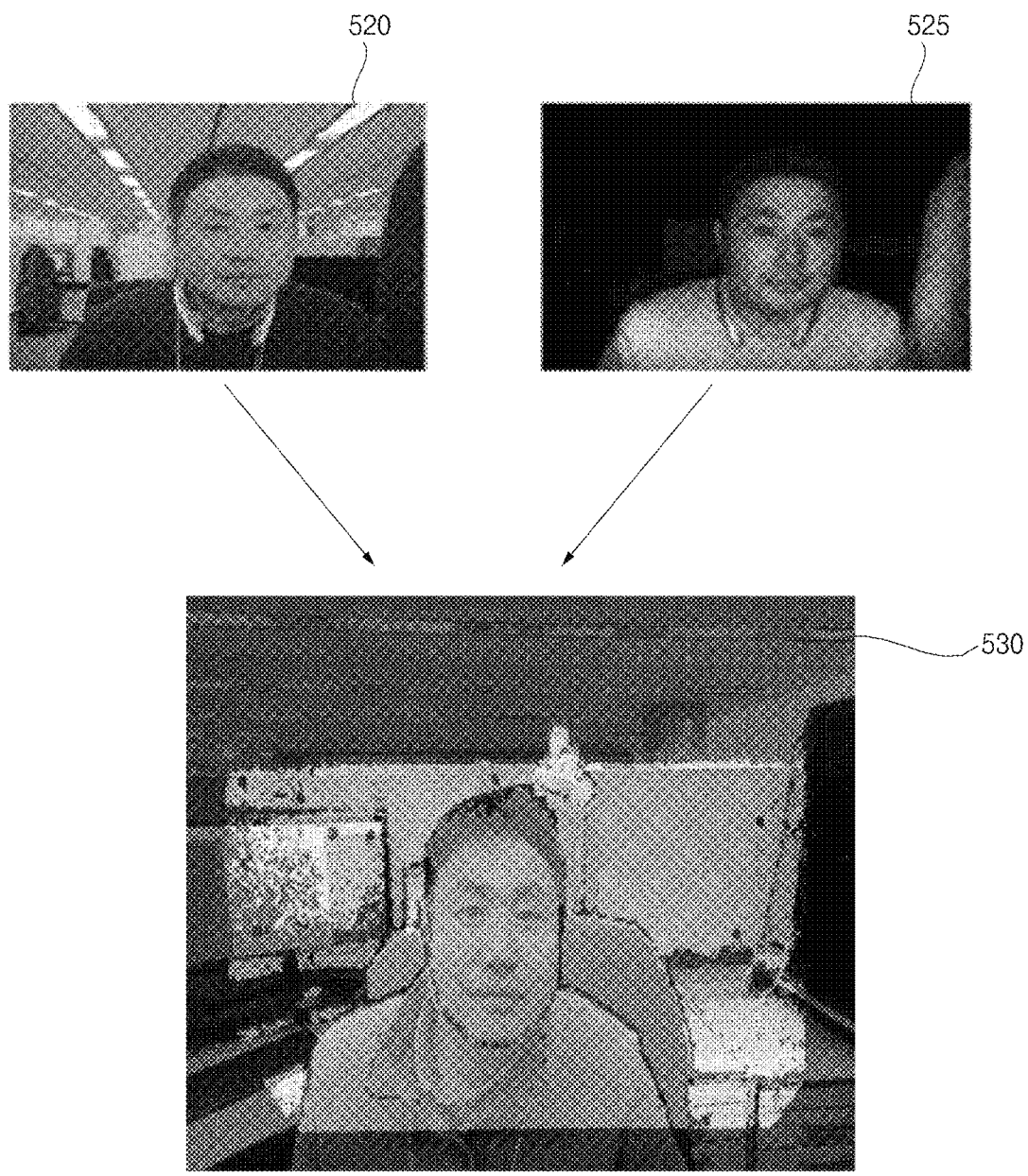

FIG. 10E illustrates a downscaled color image 520 and an upscaled IR image 525.

Meanwhile, the processor 170 may perform matching by using the downscaled color image 520 and the upscaled IR image 525.

For example, the processor 170 may match the upscaled IR image 525 to the downscaled color image 520. Further, the processor 170 may calculate error information based on the difference.

For example, by analyzing each feature point based on the downscaled color image 520 and the upscaled IR image 525, the processor 170 may calculate 3D error information.

Specifically, by analyzing each feature point based on the downscaled color image 520 and the upscaled IR image 525, the processor 170 may calculate 3D error information, such as the relative rotation information, relative translation information, or relative shift information, between the color image Imgr and the IR image Imgt.

In addition, the processor 150 may output the compensated color image or the compensated IR image based on the calculated 3D error information.

Figure 10F:

FIG. 10F illustrates an example of a compensated color image 540. Unlike the drawing, a compensated IR image may also be output.

Accordingly, the difference between the color image from the color camera and the IR image from the IR camera may be compensated rapidly and accurately.

Figure 11A:
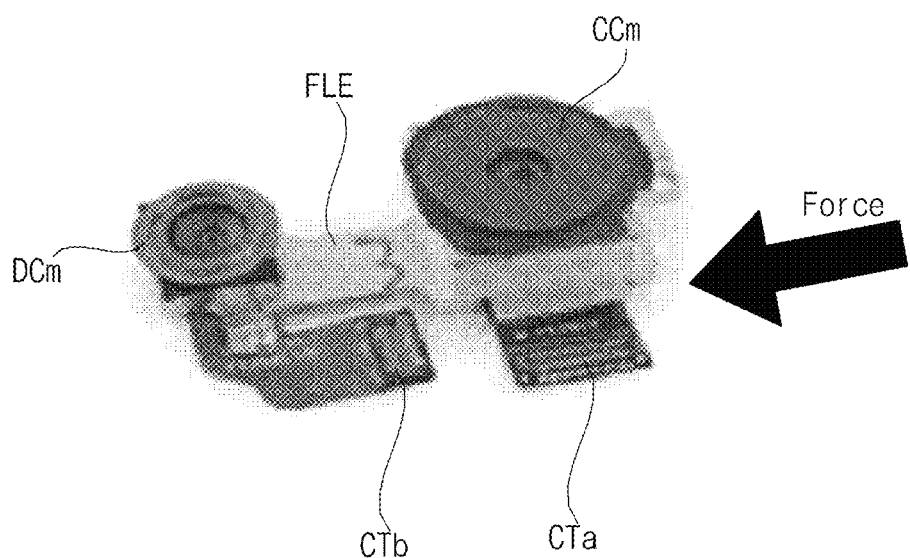
FIGS. 11A to 11C are diagrams referred to in the description of a distortion between a color camera and an IR camera in the case where there is an impact on a camera device.
Figure 11B:
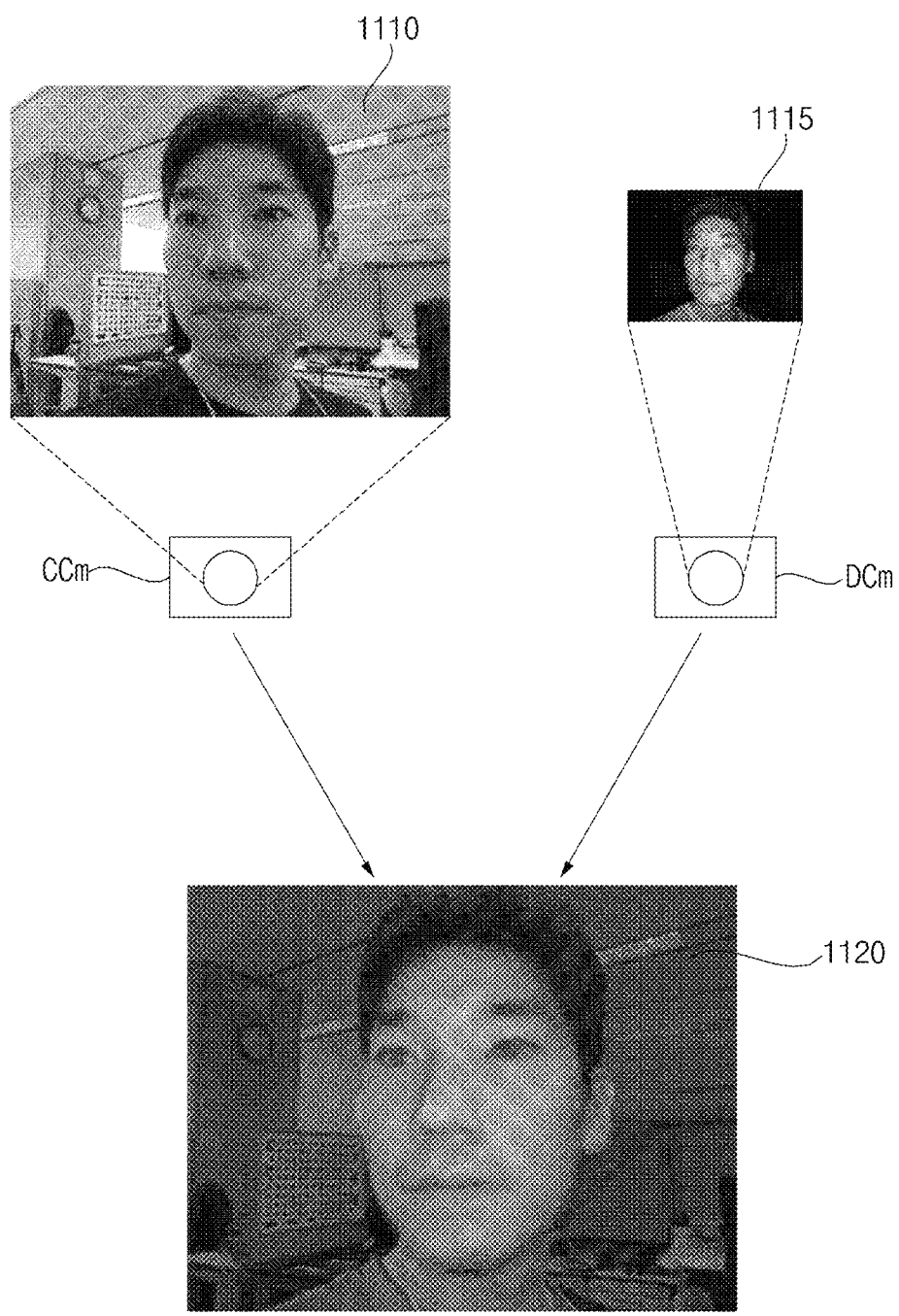
Figure 11C:
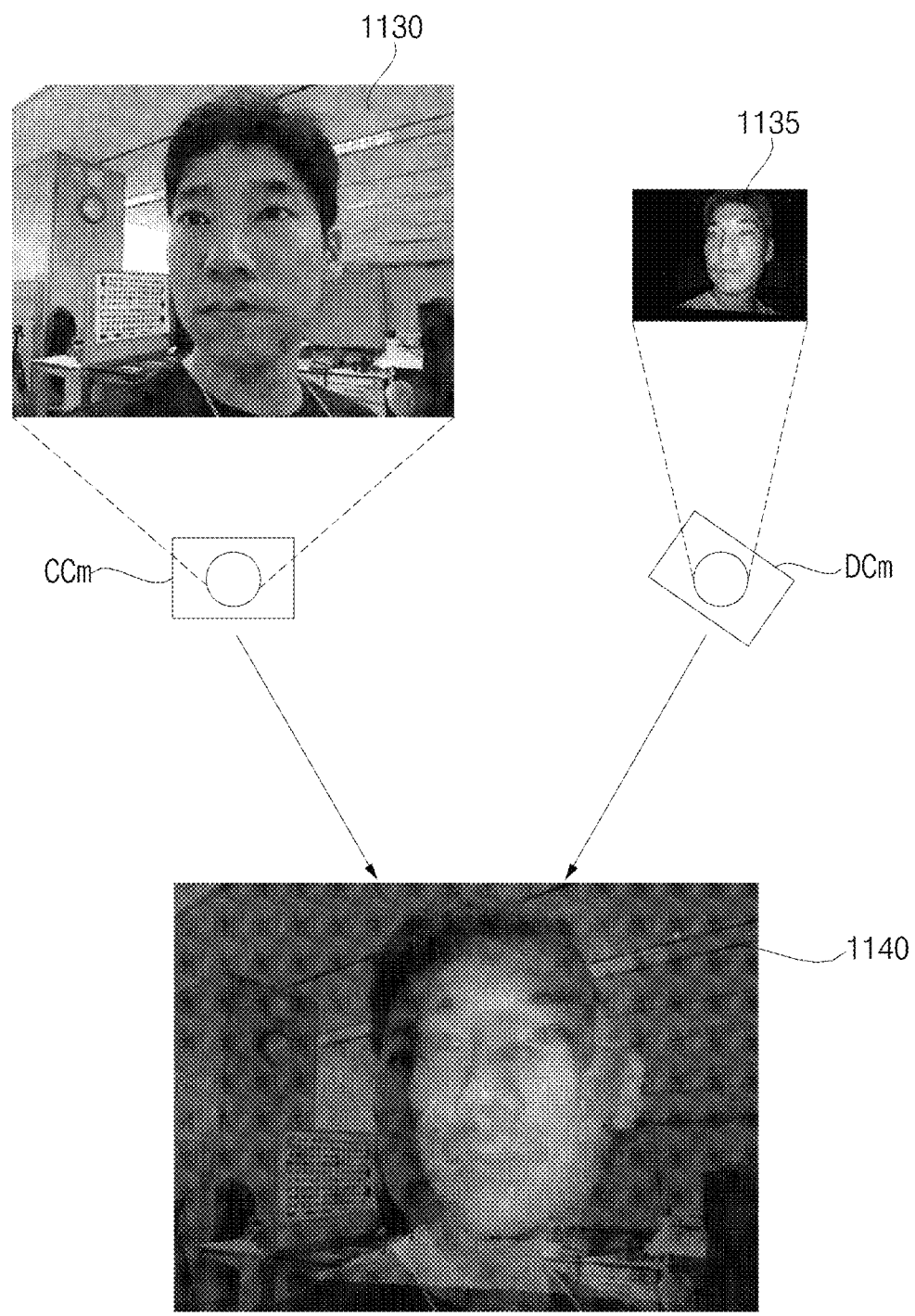

FIGS. 11A to 11C are diagrams referred to in the description of misalignment occurring between a color camera and an IR camera in the case where there is an impact on a camera device.

Referring to FIG. 11A, if an impact is applied to a side surface of the camera device 100, misalignment occurs between the color camera CCm and the IR camera DCm.

Accordingly, if there is no impact as illustrated in FIG. 11B, it is not appropriate to use 3D information as it is, which is calculated based on a difference between a color image 1110 from the color camera CCm and an IR image 1115 from the IR camera DCm.

FIG. 11B illustrates a synthesized image 1120 using the color image 1110 from the color camera CCm and the IR image 1115 from the IR camera DCm, in the case where there is no impact.

Meanwhile, of a color image 1130 from the color camera CCm and an IR image 1135 from the IR camera DCm, at least the IR image 1135 is input while being misaligned when there is no impact as illustrated in FIG. 11C.

Accordingly, if the processor 170 generates a synthesized image by using pre-stored 3D information as it is, a synthesized image 1140 having an error is generated as illustrated in FIG. 11C.

A method of compensating for misalignment or distortion, caused by an external impact, movement of the camera device 100, etc., between the color camera CCm and the IR camera DCm will be described with reference to FIG. 12 and the following figures.

Figure 12:
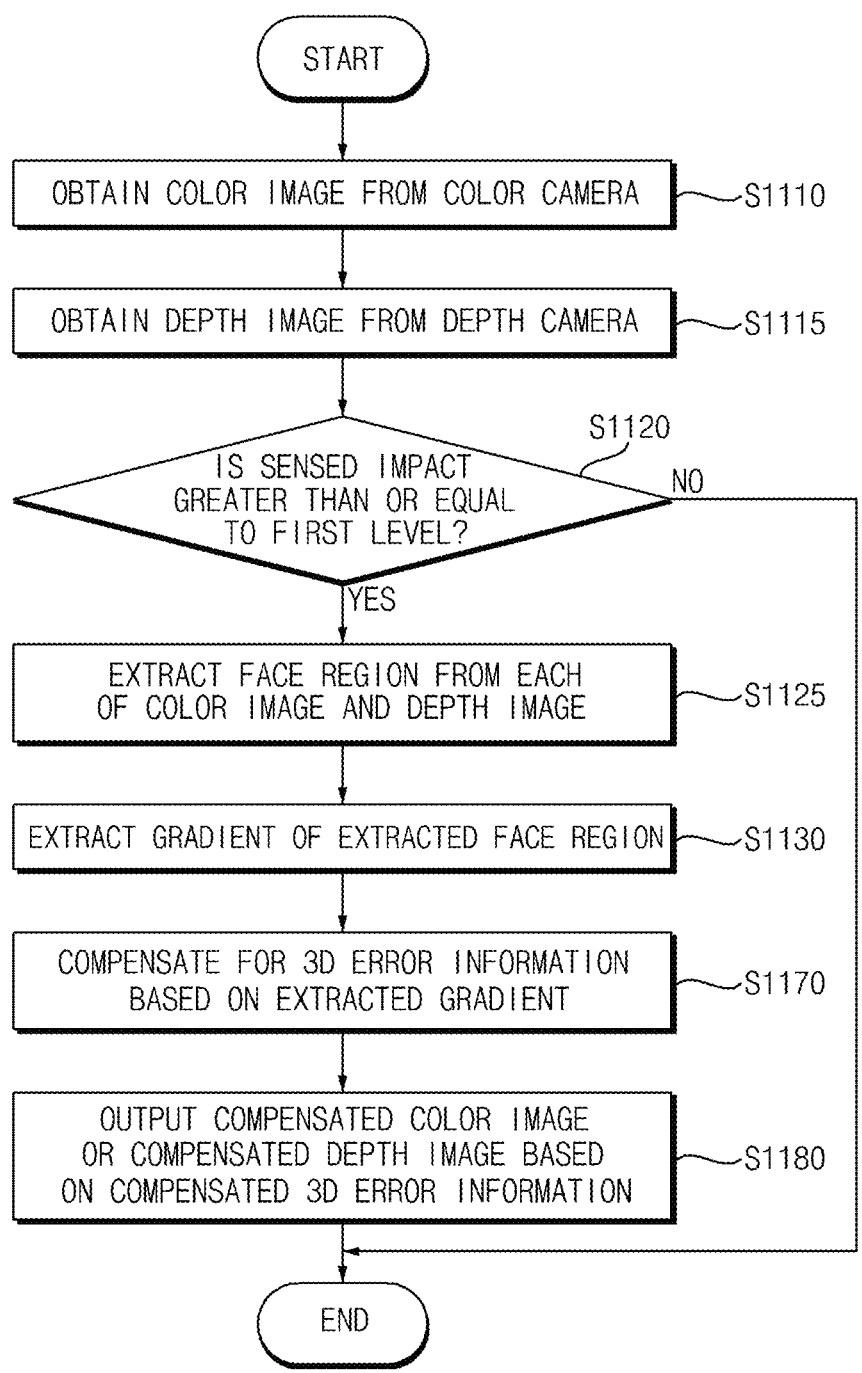
FIG. 12 is a flowchart illustrating an operating method of a camera device according to an embodiment of the present disclosure.

FIG. 12 is a flowchart illustrating an operating method of a camera device according to an embodiment of the present disclosure.

Referring to the drawing, the processor 170 in the camera device 100 obtains a color image from the color camera CCm (S1110).

The, the processor 170 in the camera device 100 obtains an IR image from the IR camera DCm (S1115).

The obtained color image and IR image may be images captured of the same pattern or object.

For example, a color image and an IR image captured of the grid pattern PAT of circles of a plurality of sizes as illustrated in FIG. 7 may be obtained at a first time point.

Figure 13A:
FIGS. 13A to 13F are diagrams referred to in the description of the operating method of FIG. 12.
Figure 13A:
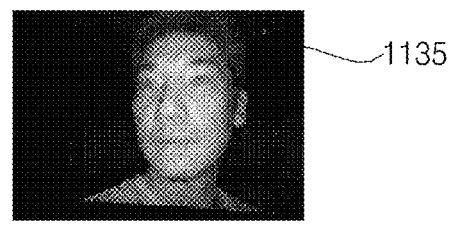

In another example, a color image and an IR image including a common face area may be obtained as illustrated in FIG. 13A.

Then, based on a signal input by the sensor device 130, the processor 170 in the camera device 100 may determine whether an impact is sensed or whether the sensed impact is greater than or equal to a first level (S1120).

Further, if the sensed impact is greater than or equal to the first level, the processor 170 in the camera device 100 may extract a first region of the color image and may extract a second region of the IR image (S1125).

The first region and the second region may include a face region.

That is, if the impact sensed by the sensor device 130 is greater than or equal to the first level, the processor 170 in the camera device 100 may extract the face region from each of the color image and the IR image.

Subsequently, the processor 170 in the camera device 100 may extract a gradient of the extracted face region (S1130).

The gradient may include a gradient of rotation information, translation information, or shift information of the color image 1130 or the IR image 1135.

Next, the processor 170 in the camera device 100 may compensate for 3D error information based on the extracted gradient (S1170).

Then, the processor 170 in the camera device 100 may output a compensated color image or a compensated depth image based on the compensated 3D error information (S1180).

Meanwhile, the processor 170 may upscale the IR image 1135, may calculate 3D error information based on a difference between a gradient of the color image and a gradient of the upscaled IR image, and may compensate for at least one of the color image 1130 an the IR image 1135 based on the calculated 3D error information to output the compensated color image 1350 or the compensated IR image. Particularly, based on the calculated 3D error information, a difference between the color image 1130 from the color camera CCm and the IR image 1135 from the IR camera DCm may be compensated rapidly and accurately.

FIG. 13A illustrates the color image 1130 from the color camera CCm and the IR image 1135 from the IR camera DCm.

If there is no difference in resolution between the color camera CCm and the IR camera DCm, a resolution of the color image 1130 may be higher than a resolution of the IR image 1135.

Figure 13B:
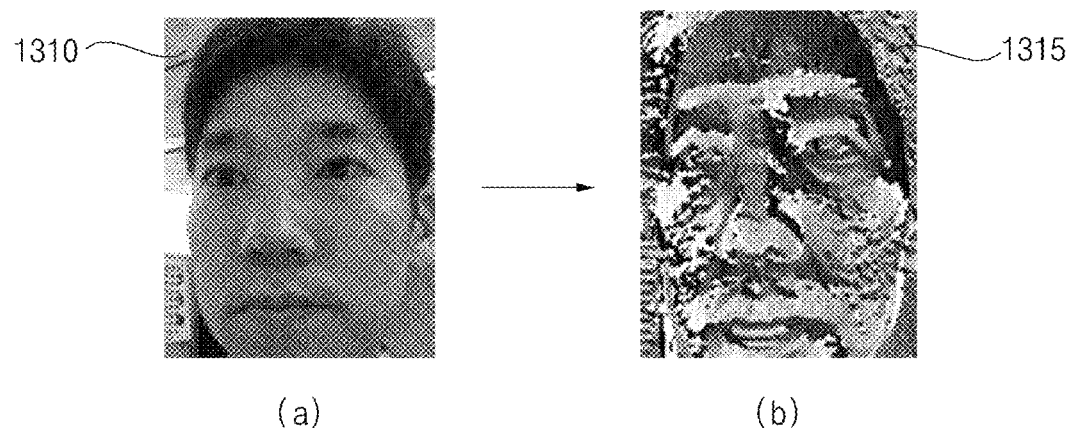
Figure 13B:
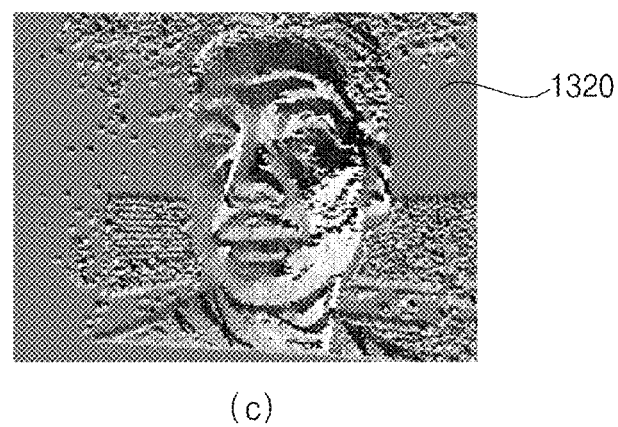

Meanwhile, the processor 170 may upscale the IR image 1135, and may extract a face region 1320 from the upscaled IR image as illustrated in FIG. 13B, to calculate a gradient of the extracted face region 1320.

Meanwhile, the processor 170 may extract a face region 1310 from the color image 1130 as illustrated in FIG. 13B and may calculate a gradient of the extracted face region 1310.

In FIG. 13B, (b) illustrates a gradient 1315 related to the face region of the color image.

Meanwhile, based on a difference between a gradient of the color image and a gradient of the IR image, the processor 170 may calculate 3D error information, and may compensate for at least one of the color image 1130 and the IR image 1135 based on the calculated 3D error information to output the compensated color image 1350 or the compensated IR image. Particularly, based on the calculated 3D error information, a difference between the color image 1130 from the color camera CCm and the IR image 1135 from the IR camera DCm may be compensated rapidly and accurately.

Meanwhile, the processor 170 may normalize the respective gradients of the color image and the IR image, may calculate 3D error information based on a difference between the normalized gradients, and may compensate for least one of the color image 1130 and the IR image 1135 based on the calculated 3D error information to output the compensated color image 1350 or the compensated IR image. Particularly, based on the normalization, a difference between the color image 1130 from the color camera CCm and the IR image 1135 from the IR camera DCm may be compensated rapidly and accurately.

Figure 13C:
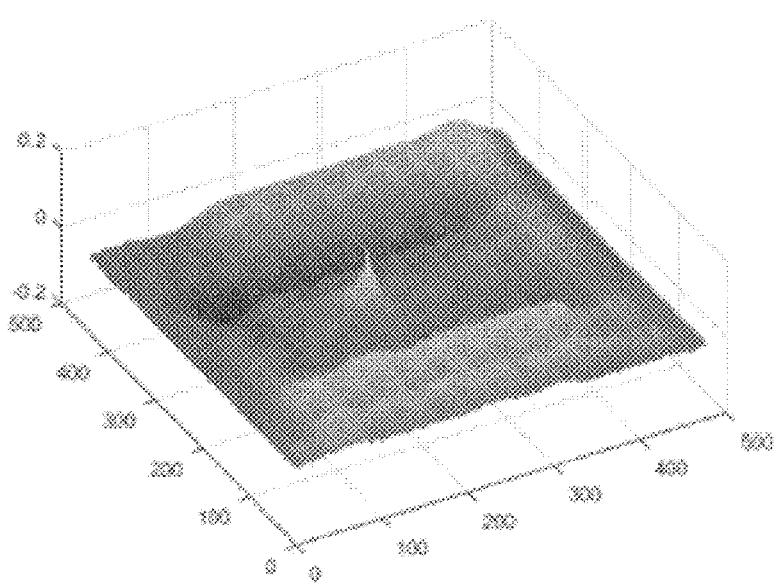

FIG. 13C illustrates an example of calculating dx and dy by normalizing the respective gradients 1315 and 1320 of the color image and the IR image.

Figure 13D:
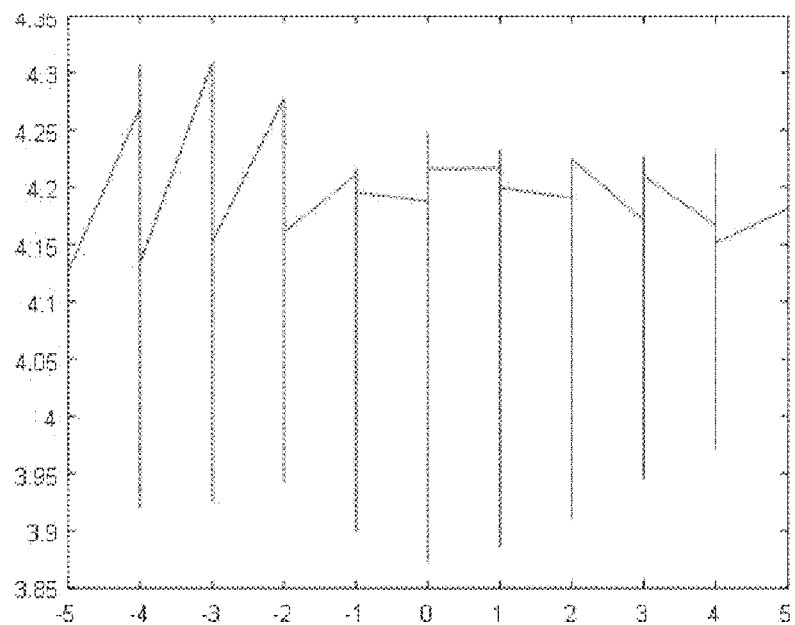

Next, FIG. 13D illustrates an example of calculating dθ and recalculating dx and dy based on the normalization of FIG. 13C.

Meanwhile, the processor 170 may calculate a distortion degree H of homography based on the calculated dθ and the recalculated dx and dy, and may compensate for 3D translation information, 3D shift information, 3D rotation information, and the like based on the calculation.

For example, the processor 170 may update 3D error information, which is calculated and pre-stored as illustrated in FIG. 6 and the like, by using the calculated compensation value based on FIGS. 13B to 13D.

Further, by compensating for at least one of the color image 1130 and the IR image 1135 based on the updated 3D error information, the processor 170 may output the compensated color image 1350 or the compensated IR image.

Meanwhile, the processor 170 may extract a first region 1310 from the color image 1130 obtained from the color camera CCm, may extract a second region 1320 from the IR image 1135 obtained from the IR camera DCm, may calculate error information based on a difference between a gradient of a luminance component of the first region 1310 and a gradient of a luminance component of the second region 1320, and may compensate for at least one of the color image 1130 and the IR image 1135 based on the calculated error information to output the compensated color image 1350 or the compensated IR image. Accordingly, a difference between the color image 1130 from the color camera CCm and the IR image 1135 from the IR camera DCm may be compensated rapidly and accurately.

Figure 13E:
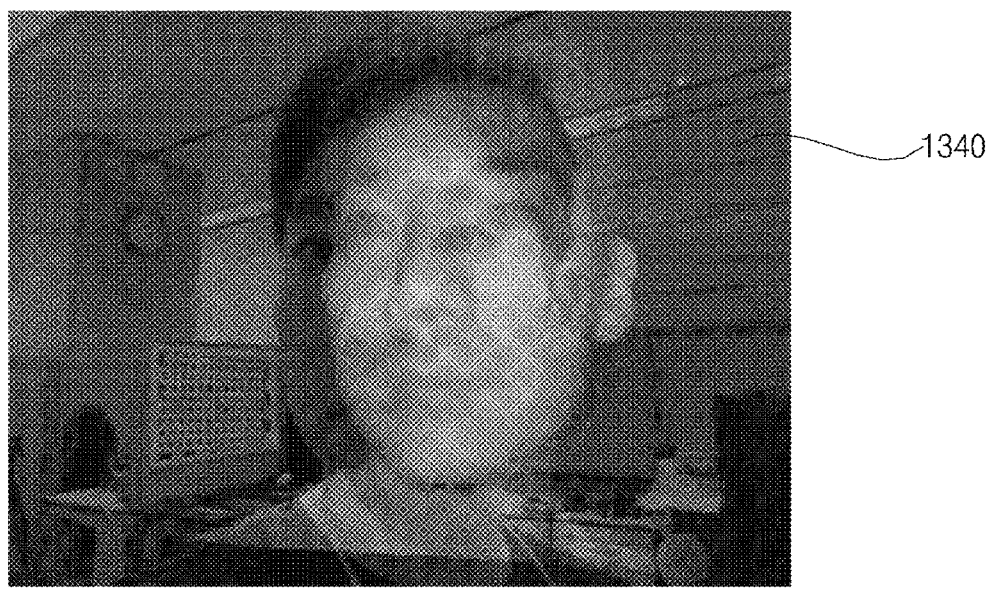

FIG. 13E illustrates an example in which under external impact, an IR image and a color image, which are uncompensated, are synthesized and misaligned.

Referring to the drawing, face regions and the like do not coincide in a synthesized image 1340.

Figure 13F:
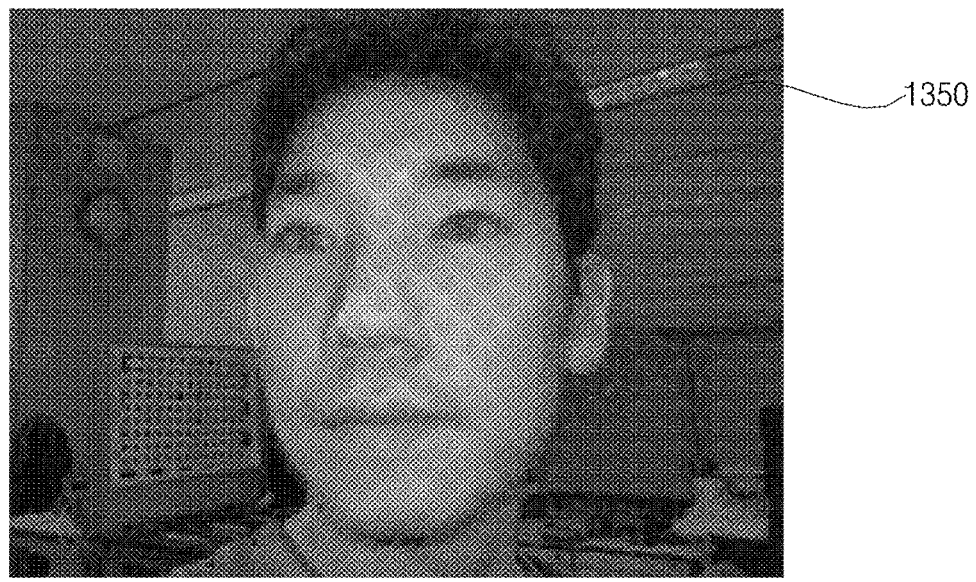

FIG. 13F illustrates an example in which under external impact, the IR image and the color image, which are compensated, are synthesized and aligned.

Referring to the drawing, face regions and the like coincide in a synthesized image 135. Accordingly, a difference between the color image and the IR image may be compensated rapidly and accurately.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. A camera device comprising:
   a color camera;
   an infrared (IR) camera;
   a flexible connection member connecting the color camera and the IR camera;
   a sensor device configured to sense a movement or impact: and
   a processor configured to:
   in response to the movement or the impact sensed by the sensor device being less than a first level, calculate three-dimensional (3D) error information based on a color image from the color camera and an IR image from the IR camera, compensate for at least one of the color image and the IR image based on the calculated 3D error information, and output a compensated color image or a compensated IR image, and
   in response to the movement or the impact sensed by the sensor device being greater than or equal to the first level, extract a first region of a color image from the color camera, extract a second region of an IR image from the IR camera, calculate error information based on a difference between a gradient of the first region and a gradient of the second region, compensate for at least one of the color image and the IR image based on the calculated error information, and output a compensated color image or a compensated IR image.

2. The camera device of claim 1, wherein the processor is configured to:
   in response to the movement or the impact sensed by the sensor device being greater than or equal to the first level, normalize the gradient of the first region and the gradient of the second region, and compensate the 3D error information based on a difference between the normalized gradient of the first region and the normalized gradient of the second region, and
   based on the compensated 3D error information, compensate for at least one of the color image and the IR image, and output the compensated color image or the compensated IR image.

3. The camera device of claim 1, wherein in response to the movement or the impact sensed by the sensor device being less than the first level, the processor is configured to update the calculated 3D error information based on pre-stored 3D error information and the calculated 3D error information, compensate for at least one of the color image and the IR image based on the updated 3D error information, and output the compensated color image or the compensated IR image.

4. The camera device of claim 1, wherein the processor is configured to:
   in response to the movement or the impact sensed by the sensor device being less than the first level, upscale the IR image,
   extract the first region of the color image from the color camera and the second region from the upscaled IR image,
   calculate the 3D error information based on the difference between the gradient of the first region and the gradient of the second region, and
   based on the calculated 3D error information, compensate for at least one of the color image and the IR image, and output the compensated color image or the compensated IR image.

5. The camera device of claim 1, wherein the first region and the second region comprise a face region.

6. The camera device of claim 1, wherein the first gradient or the second gradient respectively comprises gradients of rotation information, translation information, or shift information of the color image or the IR image.

7. The camera device of claim 1, wherein in response to the movement or the impact sensed by the sensor device being greater than or equal to the first level, the processor is configured to extract the first region of the color image from the color camera and the second region of the IR image from the IR camera, compensate the 3D error information based on a difference between a gradient of a luminance component of the first region and a gradient of a luminance component of the second region, compensate for at least one of the color image and the IR image based on the compensated 3D error information, and output the compensated color image or the compensated IR image.

8. The camera device of claim 1, wherein the processor comprises:
   a feature point analyzer configured to analyze each feature point of the color image from the color camera and the IR image from the IR camera;
   an external variable calculator configured to calculate an external variable based on each feature point information analyzed by the feature point analyzer;
   an error calculator configured to calculate 3D error information based on the calculated external variable; and
   an error corrector configured to correct an error based on the 3D error information.

9. The camera device of claim 8, wherein, based on the each feature point information analyzed by the feature point analyzer, the external variable calculator is configured to calculate rotation information, translation information, or shift information of each of the color image and the IR image.

10. The camera device of claim 9, wherein based on the rotation information, the translation information, or shift information of each of the color image and the IR image, the error calculator is configured to calculate relative rotation information, relative translation information, or relative shift information between the color image and the IR image.

11. An electronic device comprising a camera device, wherein the camera device comprises:
    a color camera;
    an infrared (IR) camera;
    a flexible connection member connecting the color camera and the IR camera;
    a sensor device configured to sense a movement or impact: and
    a processor configured to:
    in response to the movement or the impact sensed by the sensor device being less than a first level, calculate three-dimensional (3D) error information based on a color image from the color camera and an IR image from the IR camera, compensate for at least one of the color image and the IR image based on the calculated 3D error information, and output a compensated color image or a compensated IR image, and in response to the movement or the impact sensed by the sensor device being greater than or equal to the first level, extract a first region of a color image from the color camera, extract a second region of an IR image from the IR camera, calculate error information based on a difference between a gradient of the first region and a gradient of the second region, compensate for at least one of the color image and the IR image based on the calculated error information, and output a compensated color image or a compensated IR image.

12. The electronic device of claim 11, wherein the processor is configured to:

in response to the movement or the impact sensed by the sensor device being greater than or equal to the first level, normalize the gradient of the first region and the gradient of the second region, and compensate the 3D error information based on a difference between the normalized gradient of the first region and the normalized gradient of the second region, and based on the compensated 3D error information, compensate for at least one of the color image and the IR image, and output the compensated color image or the compensated IR image.

13. The electronic device of claim 11, wherein in response to the movement or the impact sensed by the sensor device being less than the first level, the processor is configured to update the 3D error information based on pre-stored 3D error information and the calculated 3D error information, compensate for at least one of the color image and the IR image based on the updated 3D error information, and output the compensated color image or the compensated IR image.

14. The electronic device of claim 11, wherein the processor is configured to:

in response to the movement or the impact sensed by the sensor device being less than the first level, upscale the IR image, extract the first region of the color image from the color camera and the second region from the upscaled IR image, calculate the 3D error information based on the difference between the gradient of the first region and the gradient of the second region, and based on the calculated 3D error information, compensate for at least one of the color image and the IR image, and output the compensated color image or the compensated IR image.

15. The electronic device of claim 11, wherein the processor is configured to:

in response to the movement or the impact sensed by the sensor device being greater than or equal to the first level, extract the first region of the color image from the color camera and the second region of the IR image from the IR camera, and calculate error information based on the difference between the gradient of the first region and the gradient of the second region, compensate for at least one of the color image and the IR image based on the calculated error information, and output the compensated color image or the compensated ER image.

16. The electronic device of claim 11, wherein in response to the movement or the impact sensed by the sensor device being greater than or equal to the first level, the processor is configured to extract the first region of the color image from the color camera and the second region of the IR image from the IR camera, compensate the 3D error information based on a difference between a gradient of a luminance component of the first region and a gradient of a luminance component of the second region, and compensate for at least one of the color image and the IR image based on the compensated 3D error information, and output the compensated color image or the compensated IR image.

* * * * *